(12) United States Patent
Yuan et al.

(10) Patent No.: US 10,057,627 B2
(45) Date of Patent: Aug. 21, 2018

(54) METHOD, APPARATUS AND SYSTEM FOR DISPLAYING BULLET SCREEN INFORMATION

(71) Applicant: TENCENT TECHNOLOGY (SHENZHEN) COMPANY LIMITED, Shenzhen, Guangdong (CN)

(72) Inventors: Guoyong Yuan, Shenzhen (CN); Zhongwei Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/694,539

(22) Filed: Sep. 1, 2017

(65) Prior Publication Data

US 2017/0366841 A1 Dec. 21, 2017

Related U.S. Application Data

(63) Continuation of application No. PCT/CN2016/079653, filed on Apr. 19, 2016.

(30) Foreign Application Priority Data

Apr. 22, 2015 (CN) .......................... 2015 1 0194971

(51) Int. Cl.
*G06F 3/00* (2006.01)
*G06F 13/00* (2006.01)
(Continued)

(52) U.S. Cl.
CPC ..... *H04N 21/4312* (2013.01); *G06F 17/3082* (2013.01); *G06F 17/30846* (2013.01);
(Continued)

(58) Field of Classification Search
CPC .......... G06F 17/30846; G06F 3/04842; H04N 21/4312; H04N 21/4532; H04N 21/472; H04N 21/4788

See application file for complete search history.

(56) References Cited

U.S. PATENT DOCUMENTS 8,843,491 B1   9/2014 Mazniker et al.
2004/0246531 A1  12/2004 Eguchi et al.
(Continued)

FOREIGN PATENT DOCUMENTS

CN    1574830 A    2/2005
CN    102905170 A   1/2013
(Continued)

OTHER PUBLICATIONS

Second Office Action with Translation Issued in Chinese Application No. 201510194971.9 dated Jan. 17, 2018.
(Continued)

*Primary Examiner* — Oleg Asanbayev
(74) *Attorney, Agent, or Firm* — Knobbe Martens Olson & Bear LLP (57) ABSTRACT

Provided are a method, an apparatus and a system for displaying bullet screen information. The method includes playing a target video, and displaying bullet screen information of the target video during the playing of the target video; displaying a reply window corresponding to currently displayed first screen information when a selection instruction corresponding to the first screen information is received; and receiving an information sending instruction corresponding to the reply window, obtaining second screen information input by a user in the reply window, displaying the second screen information corresponding to displaying of the first screen information, and transmitting, to a server, a reply information adding request corresponding to the first screen information, with the second screen information and
(Continued)

an identifier of the first screen information being carried in the reply information adding request.

16 Claims, 6 Drawing Sheets

(51) Int. Cl.
| | | |
|---|---|---|
| H04N 5/445 | (2011.01) | |
| H04N 21/431 | (2011.01) | |
| H04N 21/472 | (2011.01) | |
| G06F 17/30 | (2006.01) | |
| H04N 21/45 | (2011.01) | |
| H04N 21/4788 | (2011.01) | |
| H04N 21/475 | (2011.01) | |
| H04N 21/81 | (2011.01) | |
| G06F 3/0484 | (2013.01) | |

(52) U.S. Cl.
CPC ..... *H04N 21/4316* (2013.01); *H04N 21/4532* (2013.01); *H04N 21/472* (2013.01); *H04N 21/4756* (2013.01); *H04N 21/4788* (2013.01); *H04N 21/8133* (2013.01); *G06F 3/04842* (2013.01)

(56) References Cited

U.S. PATENT DOCUMENTS

| | | | | |
|---|---|---|---|---|
| 2005/0262542 | A1* | 11/2005 | DeWeese | H04L 12/1818 725/106 |
| 2013/0084978 | A1* | 4/2013 | Olomskiy | G07F 17/3211 463/31 |
| 2014/0089800 | A1 | 3/2014 | Kao et al. | |
| 2016/0275588 | A1 | 9/2016 | Ye et al. | |

FOREIGN PATENT DOCUMENTS

| | | | |
|---|---|---|---|
| CN | 103150325 | A | 6/2013 |
| CN | 103412920 | A | 11/2013 |
| CN | 104113787 | A | 10/2014 |
| CN | 104156398 | A | 11/2014 |
| CN | 104486682 | A | 4/2015 |
| CN | 104504063 | A | 4/2015 |
| CN | 104869468 | A | 8/2015 |

OTHER PUBLICATIONS

International Search Report with Translation for International Application No. PCT/CN2016/079653 dated Jul. 1, 2016, 9 pages.

* cited by examiner

METHOD, APPARATUS AND SYSTEM FOR DISPLAYING BULLET SCREEN INFORMATION

CROSS REFERENCE OF RELATED APPLICATION

This application is a continuation of International Application No. PCT/CN2016/079653, titled "METHOD, APPARATUS AND SYSTEM FOR DISPLAYING SCREEN INFORMATION", filed on Apr. 19, 2016, which claims priority to Chinese Patent Application No. 201510194971.9 titled "METHOD AND APPARATUS FOR DISPLAYING BULLET SCREEN INFORMATION" filed on Apr. 22, 2015 with the State Intellectual Property Office of the People's Republic of China, both of which are incorporated herein by reference in their entireties.

TECHNICAL FIELD

The present disclosure relates to the technical field of Internet, and in particular to a method, an apparatus and a system for displaying bullet screen information.

BACKGROUND

With rapid development of network technology, Internet has been widely applied and become one of the most important tools in people's work and life. People may watch an online video on the Internet and make comments while watching. During the playing of the online video, the user's comments may be dynamically displayed in a terminal, and the comment information displayed dynamically may be referred to as bullet screen information.

During the playing of the online video by the terminal, the bullet screen information released by each user with respect to the online video can be obtained by the terminal from the server, and then be added by the terminal to the online video for displaying. In this way, a user can read comments from other users easily while watching the online video.

In the process of conceiving embodiments according to the present disclosure, the inventors find that the related technology has at least the following drawbacks.

During the playing of the online video, each of the users makes comments on the played online video independently, and then the comments are displayed by the terminal dynamically, resulting in a poor flexibility of releasing bullet screen information by the user.

SUMMARY

In order to solve the above related technical issues, it is provided, in embodiments of the present disclosure, a method, an apparatus and a system for displaying bullet screen information. The technical solution is described as follows.

In a first aspect, it is provided a method for displaying bullet screen information. The method includes playing a target video, and displaying bullet screen information of the target video during the playing of the target video. The method further includes displaying a reply window corresponding to currently displayed first bullet screen information when a selection instruction corresponding to the first bullet screen information is received. The method further includes receiving an information transmission instruction corresponding to the reply window, obtaining second bullet screen information inputted by a user in the reply window, displaying the second bullet screen information corresponding to displaying of the first bullet screen information, and transmitting a reply information adding request corresponding to the first bullet screen information to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information.

In a second aspect, it is provided a method for displaying bullet screen information. The method includes receiving a reply information adding request corresponding to first bullet screen information and transmitted by a terminal. Second bullet screen information and an identifier of the first bullet screen information are carried in the reply information adding request. The method further includes adding the second bullet screen information to bullet screen information of a target video. The method further includes recording the second bullet screen information as reply information of the first bullet screen information.

In a third aspect, it is provided a terminal. The terminal includes a display module and a transmission module. The display module is configured to play a target video, and display bullet screen information of the target video during the playing of the target video. The display module is further configured to display a reply window corresponding to currently displayed first bullet screen information when a selection instruction corresponding to the first bullet screen information is received. The transmission module is configured to receive an information transmission instruction corresponding to the reply window, obtain second bullet screen information inputted by a user in the reply window, display the second bullet screen information corresponding to displaying of the first bullet screen information, and transmit a reply information adding request corresponding to the first bullet screen information to a server. The second bullet screen information and an identifier of the first bullet screen information are carried in the reply information adding request, so that the server adds the second bullet screen information to the bullet screen information of the target video, and records the second bullet screen information as reply information of the first bullet screen information.

In a fourth aspect, it is provided a server. The server includes a receiving module and a recording module. The receiving module is configured to receive a reply information adding request corresponding to first bullet screen information and transmitted by a terminal. Second bullet screen information and an identifier of the first bullet screen information are carried in the reply information adding request. The recording module is configured to add the second bullet screen information to bullet screen information of a target video and record the second bullet screen information as reply information of the first bullet screen information.

In a fifth aspect, it is provided a terminal. The terminal includes one or more processors and a memory having one or more programs stored therein. The one or more programs are configured to be executed by the one or more processors. The one or more programs include instructions for playing a target video and displaying bullet screen information of the target video during the playing of the target video. The one or more programs further include instructions for displaying a reply window corresponding to currently displayed first bullet screen information when a selection instruction corresponding to the first bullet screen information is received. The one or more programs further include instructions for receiving an information transmission instruction corresponding to the reply window, obtaining second bullet screen information inputted by a user in the reply window, displaying the second bullet screen information corresponding to displaying of the first bullet screen information, and transmitting a reply information adding request corresponding to the first bullet screen information to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information.

In a sixth aspect, it is provided a server. The server includes one or more processors and a memory having one or more programs stored therein. The one or more programs are configured to be executed by the one or more processors. The one or more programs include instructions for receiving a reply information adding request corresponding to first bullet screen information and transmitted by a terminal. Second bullet screen information and an identifier of the first bullet screen information are carried in the reply information adding request. The one or more programs further include instructions for adding the second bullet screen information to bullet screen information of a target video, and recording the second bullet screen information as reply information of the first bullet screen information.

In a seventh aspect, it is provided a system for displaying bullet screen information. The system includes a terminal and a server. The terminal is configured to play a target video and display bullet screen information of the target video during the playing of the target video. The terminal is further configured to display a reply window corresponding to currently displayed first bullet screen information when a selection instruction corresponding to the first bullet screen information is received. The terminal is further configured to receive an information transmission instruction corresponding to the reply window, obtain second bullet screen information inputted by a user in the reply window, display the second bullet screen information corresponding to displaying of the first bullet screen information, and transmit a reply information adding request corresponding to the first bullet screen information to a server. The second bullet screen information and an identifier of the first bullet screen information are carried in the reply information adding request. The server is configured to receive the reply information adding request corresponding to the first bullet screen information and transmitted by the terminal. The server is further configured to add the second bullet screen information to the bullet screen information of the target video, and record the second bullet screen information as reply information of the first bullet screen information.

Advantageous effects of the technical solution provided by the embodiments of the present disclosure are described hereinafter.

In embodiments of the present disclosure, a target video is played. Bullet screen information of the target video is displayed during the playing of the target video. A reply window corresponding to currently displayed first bullet screen information is displayed when a selection instruction corresponding to the first bullet screen information is received. An information transmission instruction corresponding to the reply window is received. Second bullet screen information inputted by a user in the reply window is obtained. The second bullet screen information is displayed corresponding to the displaying of the first bullet screen information is displayed. A reply information adding request corresponding to the first bullet screen information is transmitted to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information. In this way, in the process of watching the target video, a user may not only release bullet screen information but also reply to bullet screen information released by other users, thereby improving the flexibility of releasing bullet screen information by the user.

BRIEF DESCRIPTION OF THE DRAWINGS

The accompany drawings used in the description of the embodiments will be described briefly as follows, so that the technical solutions according to the embodiments of the present invention will become more apparent. It is clear that the accompany drawings in the following description are only some embodiments of the present disclosure. For those skilled in the art, other accompany drawings may be obtained and fall within the disclosure.

DETAILED DESCRIPTION OF THE EMBODIMENTS

In order to illustrate the objects, technical solutions and advantages of the present disclosure more clearly, embodiments of the present disclosure will be described in detail in conjunction with the drawings.

First Embodiment

In an embodiment of the present disclosure, it is provided a method for displaying bullet screen information. The method can be realized by a terminal in combination with a server. The terminal may be a terminal capable of playing a video. The terminal may be installed with an application for video playing. The terminal may be a mobile phone, a computer or the like. The server may be a video server for storing video data, or may be a background server for the application for video playing.

Figure 1:
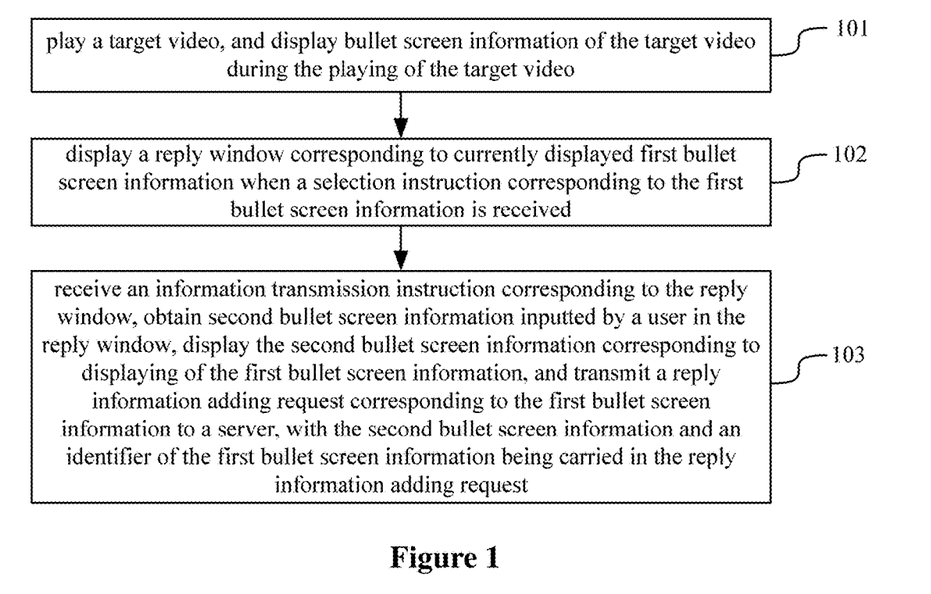
FIG. 1 is a flowchart of a method for displaying bullet screen information according to an embodiment of the present disclosure.

As shown in FIG. 1, a process of the method to be performed by the terminal may include the following steps 101 to 103.

In step 101, a target video is played, and bullet screen information of the target video is displayed during the playing of the target video.

In step 102, a reply window corresponding to currently displayed first bullet screen information is displayed when a selection instruction corresponding to the first bullet screen information is received.

In step 103, an information transmission instruction corresponding to the reply window is received, second bullet screen information inputted by a user in the reply window is obtained, the second bullet screen information is displayed corresponding to displaying of the first bullet screen information, a reply information adding request corresponding to the first bullet screen information is transmitted to a server, with the second bullet screen information and an identifier of the first bullet screen information being carried in the reply information adding request, so as to add, by the server, the second bullet screen information to the bullet screen information of the target video; and to record, by the server, the second bullet screen information as reply information of the first bullet screen information.

Figure 2:
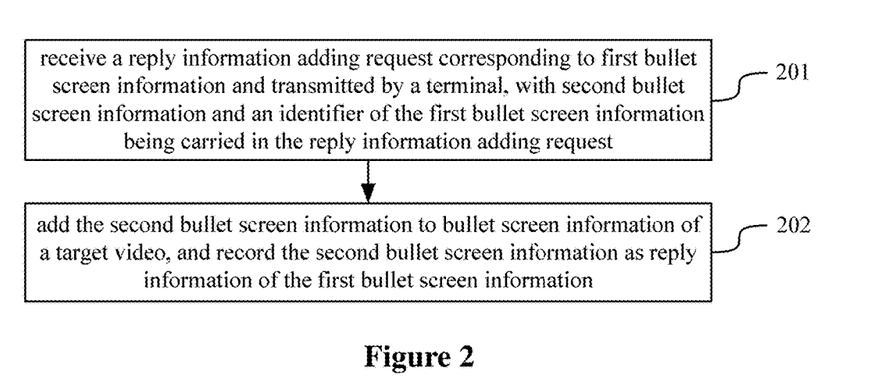
FIG. 2 is a flowchart of a method for displaying bullet screen information according to an embodiment of the present disclosure.

As shown in FIG. 2, a process of the method to be performed by the server may include the following steps 201 and 202.

In step 201, a reply information adding request corresponding to first bullet screen information and transmitted by a terminal is received, with second bullet screen information and an identifier of the first bullet screen information being carried in the reply information adding request.

In step 202, the second bullet screen information is added to bullet screen information of a target video, and the second bullet screen information is recorded as reply information of the first bullet screen information.

In embodiments of the present disclosure, a target video is played. Bullet screen information of the target video is displayed during the playing of the target video. A reply window corresponding to currently displayed first bullet screen information is displayed when a selection instruction corresponding to the first bullet screen information is received. An information transmission instruction corresponding to the reply window is received. Second bullet screen information inputted by a user in the reply window is obtained. The second bullet screen information is displayed correspondingly while the first bullet screen information is displayed. A reply information adding request corresponding to the first bullet screen information is transmitted to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information. In this way, in the process of watching the target video, a user may not only release bullet screen information but also reply to bullet screen information released by other users, thereby improving the flexibility of releasing bullet screen information by the user.

Second Embodiment

In an embodiment of the present disclosure, it is provided a method for displaying bullet screen information. The method can be realized by a server in combination with a terminal. The terminal may be a terminal capable of playing a video. The terminal may be installed with an application for video playing. The terminal may be a mobile phone, a computer or the like. The server may be a video server for storing video data, or may be a background server for the application for video playing. A processor, a memory, a transceiver and the like may be provided in the terminal. The processor may be configured to process a process of displaying the bullet screen information. The memory may be configured to store data required and received in the process of displaying the bullet screen message. The transceiver may be configured to receive and transmit messages. The terminal may also include an input and output device, such as a screen. The screen may be configured to display a video screen in play and the bullet screen information. The screen may be a touch screen. A processor, a memory, a transceiver and the like may be provided in the server. The processor may be configured to process a process of displaying the bullet screen information. The memory may be configured to store data required and received in the process of displaying the bullet screen message. The transceiver may be configured to receive and transmit messages.

Figure 3:
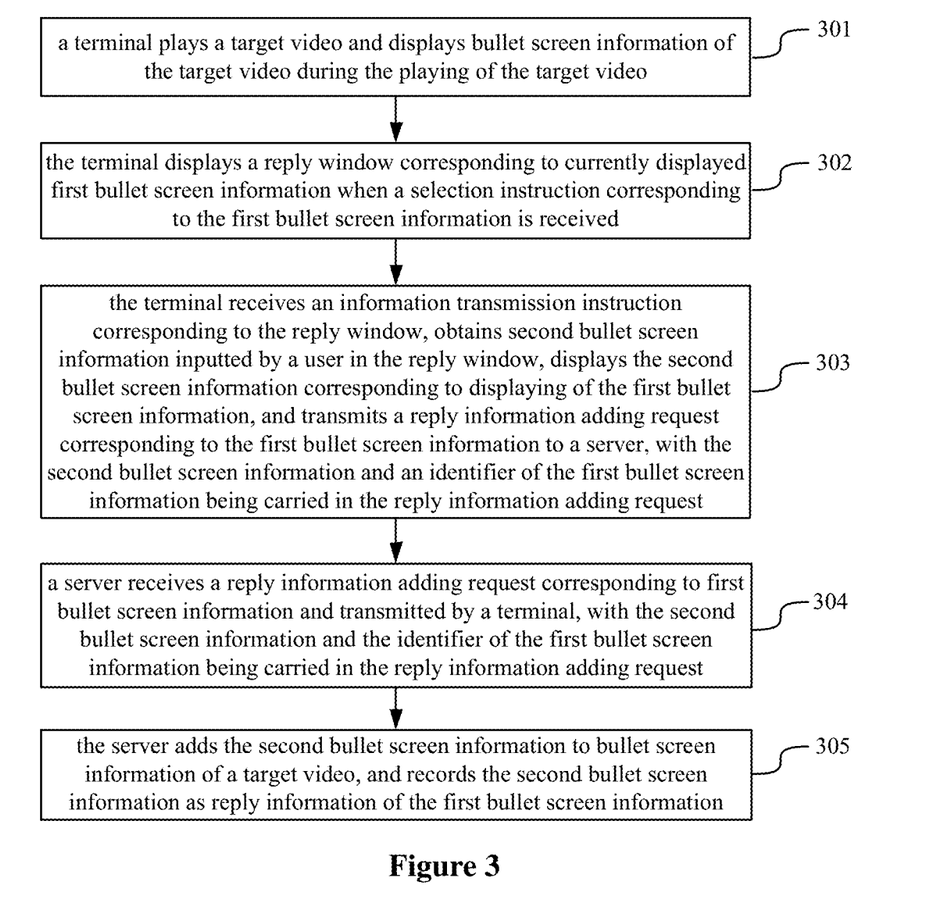
FIG. 3 is a flowchart of a method for displaying bullet screen information according to an embodiment of the present disclosure.

As shown in FIG. 3, a process flow of the method may include the following steps 301 to 305.

In step 301, a target video is played, and bullet screen information of the target video is displayed during the playing of the target video.

In implementation, an application for video playing may be installed in the terminal. A video list may be provided in the application. A user may select a certain video (the target video) in the video list by clicking on an icon for the video, and a playing instruction corresponding to the video may be detected by the terminal. In this case, the terminal may be triggered to generate a play request. A video identifier of the video selected by the user is added to the play request and then the play request is transmitted to the server. A database may be provided in the server. In the database, there may be stored mass of video data, bullet screen information corresponding to each video and released by different users, and reply information corresponding to each piece of bullet screen information. The reply information refers to bullet screen information that is released by a user with respect to a certain piece of bullet screen information for replying to this bullet screen information. Thus, the reply information is bullet screen information and is displayed in the form of bullet screen. In addition, in the server it may also be stored a bullet screen time point corresponding to each piece of bullet screen information. The bullet screen time point may be a time point indicating a playing progress of the video when the bullet screen information is released by a user. For example, when the video is played to the tenth minute and the fifteenth second, if a bullet screen information of "Xiaoxin is so cute" is released by the user, the bullet screen time point corresponding to the bullet screen information of "Xiaoxin is so cute" is the tenth minute and the fifteenth second. In the application, a function may be provided for the user to release bullet screen information. By means of this function, the bullet screen information can be released by the user, and the bullet screen time point corresponding to this bullet screen information can be transmitted to the server, so that the server can get and store the bullet screen information and the bullet screen time point corresponding thereto. For example, in a playing interface for the target video, a bullet screen information releasing option may be provided. A user may click the bullet screen information releasing option if the user wants to release the bullet screen information, and in this case, selection instruction for the bullet screen information releasing option will be received by the terminal. And then a releasing window corresponding to the bullet screen information releasing option is displayed. In the releasing window, it may be displayed an account identifier of a current login account, and an input box for inputting bullet screen information. The user may input, in the input box, information to be released, and then click on the transmission button. The terminal will receive an information transmission instruction corresponding to the releasing window. The first bullet screen information inputted by the user in the input box may be obtained by the terminal. Then the first bullet screen information may be displayed locally and the bullet screen time point corresponding to the first bullet screen information may be obtained. The first bullet screen information and the bullet screen time point corresponding thereto are transmitted to the server, so as to be stored by the server.

After receiving a playing request of the target video transmitted by the terminal, the server may parse the playing request to obtain a video identifier of the target video carried in the playing request. Data of target video corresponding to the video identifier are searched and obtained in the database. Bullet screen information of the target video corresponding to the video identifier may be searched and obtained in the database according to the video identifier, and then reply information corresponding to each piece of bullet screen information and a bullet screen time point corresponding to each piece of bullet screen information are obtained. The data of the target video, the bullet screen information of the target video, the reply information corresponding to each piece of bullet screen information and the bullet screen time point corresponding to each piece of bullet screen information are transmitted to the terminal. After receiving the data of the target video, the bullet screen information of the target video, the reply information corresponding to each piece of bullet screen information and the bullet screen time point corresponding each piece of bullet screen information, the terminal may play the target video, and display each piece of bullet screen information of the target video and reply information corresponding to the bullet screen information based on the bullet screen time point of the bullet screen information during the playing of the target video. For example, if the bullet screen time point corresponding to the bullet screen information of "Xiaoxin is so cute" is the tenth minute and the fifteenth second, the bullet screen information of "Xiaoxin is so cute" and the reply information corresponding to this bullet screen information are displayed in the terminal when the video is played to the tenth minute and the fifteenth second.

Optionally, the bullet screen information that has been replied to by the local login user may be displayed firstly. Accordingly, the process of step 301 may be as follows. The bullet screen information corresponding to which the reply information adding request has been transmitted by a local login account and reply information corresponding to this bullet screen information are selected by the terminal among the bullet screen information of the target video, and the bullet screen information of the target video is displayed during the playing of the target video. Specifically, the selected bullet screen information and reply information are displayed firstly among multiple pieces of bullet screen information corresponding to each bullet screen time point.

In implementation, a user may reply to one piece of bullet screen information in the process of watching the target video (the specific treatment thereof will be described later). The terminal may record the identifier of the bullet screen information after the reply information adding request corresponding to the bullet screen information is transmitted by the user. When the target video is played again by the terminal, the terminal may select, based on the locally recorded identifier of the bullet screen information among the bullet screen information of the target video, the bullet screen information corresponding to the identifier, and the reply information of the bullet information corresponding to the identifier. In addition, the terminal may transmit, to the server, a request for obtaining the identifier of the bullet screen information, so as to obtain, from the server, the identifier of the bullet screen information corresponding to which the reply information adding request has been transmitted by the local login account.

Since a certain bullet screen time point may correspond to multiple pieces of bullet screen information, the terminal cannot display all the bullet screen information corresponding to the same bullet screen time point. During the playing of the target video, the selected bullet screen information and reply information are displayed firstly among multiple pieces of bullet screen information corresponding to each bullet screen time point. In the case that the selected bullet screen information and reply information are less, bullet screen information and reply information corresponding to this bullet screen information may be selected randomly among other bullet screen information corresponding to the bullet screen time point, for displaying.

Optionally, the bullet screen information which has more replies may be displayed firstly. Accordingly, the process of step 301 may be as follows. Bullet screen information with the number of replies greater than a preset threshold, and reply information corresponding to this bullet screen information are selected by the terminal among the bullet screen information of the target video, and the selected bullet screen information and reply information are displayed during the playing of the target video.

In implementation, an identifier may be provided by the server for each piece of bullet screen information corresponding to the target video, and for the reply information corresponding to each piece of bullet screen information, an identifier corresponding to the bullet screen information may be provided by the server. For example, if a certain piece of bullet screen information is identified as a, the bullet screen information has three pieces of reply information, which may be marked as a1, a2 and a3 respectively.

After receiving the data of the target video, the bullet screen information of the target video and the reply information corresponding to each piece of bullet screen information, the terminal may determine the number of reply information corresponding to each piece of bullet screen information (i.e. the number of replies) according to the identifier of the bullet screen information and the identifier of the reply information. Then bullet screen information with the number of replies greater than a preset threshold, and reply information corresponding to this bullet screen information may be determined. During the playing of the target video, the determined bullet screen information and reply information may be displayed by the terminal when the target is played to the bullet screen time point corresponding to the determined bullet screen information.

For the bullet screen information with multiple pieces of reply information, the terminal may display first preset number of pieces of reply information. When a user wishes to view other reply information of the bullet screen information, the user may click on the bullet screen information, or move the mouse pointer onto the bullet screen information. A reply information display instruction corresponding to the bullet screen information will be received by the terminal, and a second preset number of pieces of reply information may be displayed by the terminal. In addition, a reply information display option may be provided in the bullet screen information. By clicking the reply information display option by the user, a reply information display instruction corresponding to the bullet screen information will be received by the terminal, and then the reply information is displayed. For example, assuming that the first preset number is 5 and the second preset number is 15, the bullet screen information and 5 pieces of reply information may be displayed by the terminal during the playing of the target video. After receiving the reply information display instruction corresponding to the bullet screen information, 15 pieces of reply information may be displayed by the terminal.

Optionally, the bullet screen information and the reply information may be displayed in different display mode by the terminal according to the number of replies. Accordingly, the process of step 301 may be as follows. Bullet screen information with the number of replies greater than a preset threshold, and reply information corresponding to this bullet screen information are selected among the bullet screen information of the target video, and during the playing of the target video, the selected bullet screen information and reply information are displayed based on a first preset display mode information and the bullet screen information other than the selected bullet screen information and reply information are displayed based on second preset display mode information.

The display mode information may include a display font, a display color, a display position and the like. The first preset display mode information includes a display mode for the selected bullet screen information and reply information, and the second preset display mode information includes a display mode for the bullet screen information other than the selected bullet screen information and reply information.

In implementation, a bullet screen information display setting option may be displayed in a display interface of the terminal. A user may click on the bullet screen information display setting option to trigger the terminal to display a first display mode option, a second display mode option, an exit option and the like. The display mode of the bullet screen information and reply information may be changed by the user. The user may click on the first display mode option to trigger the terminal to display a display font option and a display position option. The user may click on the display font option to trigger the terminal to display a font size list, a font style list and a font color list, in each of which the user may select the size, style and color of the font respectively. The user may also click the display position option to trigger the terminal to display a middle upper option, a middle option, a middle lower option, an upper right option and the like. The user may select a display position (such as the upper right) and then click the OK button to trigger the terminal to store the selected display font and display position as the first display mode information. Alternatively, the user may click on the second display mode option to trigger the terminal to display a display font option and a display position option. The user may click on the display font option to trigger the terminal to display a font size list, a font style list and a font color list, in each of which the user may select the size, style and color of the font respectively. The user may also click the display position option to trigger the terminal to display a middle upper option, a middle option, a middle lower option, an upper right option and the like. The user may select a display position (such as the lower right) and then click the OK button to trigger the terminal to store the selected display font and display position as the second display mode information.

An identifier may be provided by the server for each piece of bullet screen information corresponding to the target video, and for the reply information corresponding to each piece of bullet screen information, an identifier corresponding to the bullet screen information may be provided by the server. For example, if a certain piece of bullet screen information is identified as a, the bullet screen information has three pieces of reply information, which may be marked as a1, a2 and a3 respectively.

After receiving the data of the target video, the bullet screen information of the target video and the reply information corresponding to each piece of bullet screen information, the terminal may determine the number of reply information corresponding to each piece of bullet screen information (i.e. the number of replies) according to the identifier of the bullet screen information and the identifier of the reply information. Then bullet screen information with the number of replies greater than a preset threshold, and reply information corresponding to this bullet screen information may be determined. The display mode information of bullet screen information with the number of replies greater than a preset threshold (i.e. the first display mode information) may be obtained, and the display mode information of the bullet screen information other than the selected bullet screen information and reply information (i.e. the second display mode information) may be obtained. During the playing of the target video, the determined bullet screen information and reply information may be displayed by the terminal based on the display font and in display position in the first display mode information. The bullet screen information other than the selected bullet screen information and reply information may be displayed by the terminal based on the display font and in display position in the second display mode information.

Optionally, a release account of a certain piece of bullet screen information may be paid attention to by the user. Accordingly, the process of step 301 may be as follows. Bullet screen information released by an account in an account attention list corresponding to the local login account and reply information corresponding to this bullet screen information are selected by the terminal among the bullet screen information of the target video, and the bullet screen information of the target video is displayed during the playing of the target video. Specifically, the selected bullet screen information and reply information are displayed firstly among multiple pieces of bullet screen information corresponding to each bullet screen time point.

In implementation, an account attention option corresponding to a release account of a certain piece of bullet screen information may be displayed in a video playing interface of the terminal. A user may click on the account attention option to pay attention to the release account. The specific process will be described later. The terminal may locally store the account attention list to record the release account to which the local login account pays attention to, or may transmit an attention list obtaining request to the server to obtain, from the server, the account attention list corresponding to the local login account. After receiving the data of the target video, the bullet screen information of the target video and the reply information corresponding to each piece of bullet screen information, the terminal may select the bullet screen information released by the release account recorded in the account attention list among the bullet screen information of the target video and then select the reply information corresponding to this bullet screen information.

Since a certain bullet screen time point may correspond to multiple pieces of bullet screen information, the terminal cannot display all the bullet screen information corresponding to the bullet screen time point. During the playing of the target video, the selected bullet screen information and reply information are displayed firstly among multiple pieces of bullet screen information corresponding to each bullet screen time point. In the case that the selected bullet screen information and reply information are less, bullet screen information and reply information corresponding to this bullet screen information may be selected randomly among other bullet screen information corresponding to the bullet screen time point, for displaying.

In addition, for a certain bullet screen time point, in the case that the amount of the selected bullet screen information and reply information is relatively large, the bullet screen information corresponding to which the reply information adding request has been transmitted by a local login account and the reply information corresponding to this bullet screen information may be selected among the selected bullet screen information and reply information, for displaying.

In step 302, a reply window corresponding to currently displayed first bullet screen information is displayed by the terminal when a selection instruction corresponding to the first bullet screen information is received.

Figure 4:
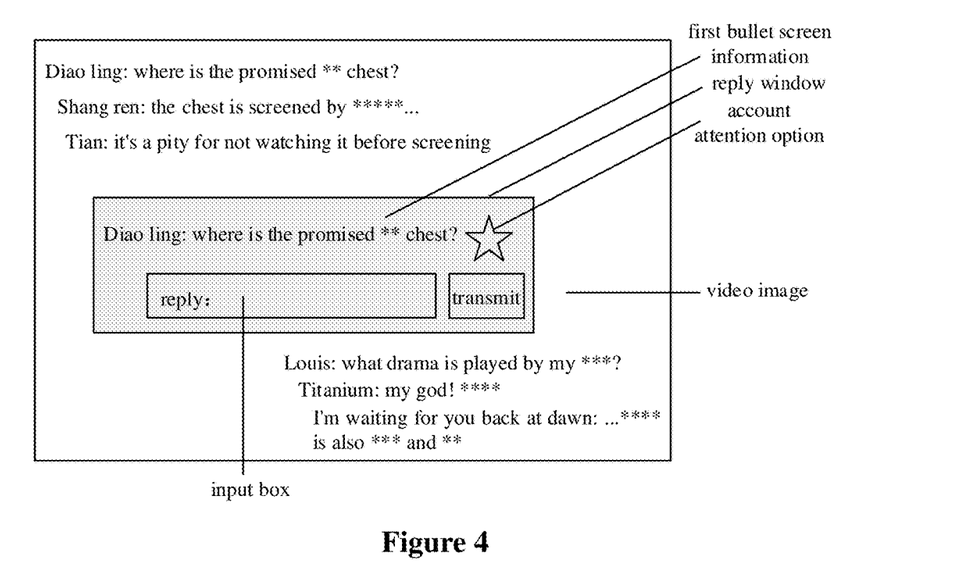
FIG. 4 is a schematic diagram of an interface display according to an embodiment of the present disclosure.

In implementation, bullet screen information of the target video may be displayed in the video playing interface of the terminal in the process of watching the target video by the user. The user may watch the bullet screen information of the target video. When the user wishes to reply to a certain piece of bullet screen information currently displayed, the user may click on the bullet screen information (i.e. first bullet screen information). A selection instruction corresponding to the currently displayed first bullet screen information may be received by the terminal, and then a reply window corresponding to first bullet screen information may be displayed. In the reply window corresponding to the first bullet screen information, an account identifier of the release account of the first bullet screen information, the first bullet screen information and an input box for inputting the reply information may be displayed. For example, the user clicks on "Where is the promisedchest?" released by a user "Diaoling", and a reply window corresponding to the "Where is the promisedchest?" released by the user "Diaoling" may be popped up, as shown in FIG. 4. Alternatively, only the input box for inputting the reply information may be displayed in the reply window corresponding to the first bullet screen information.

Figure 5:
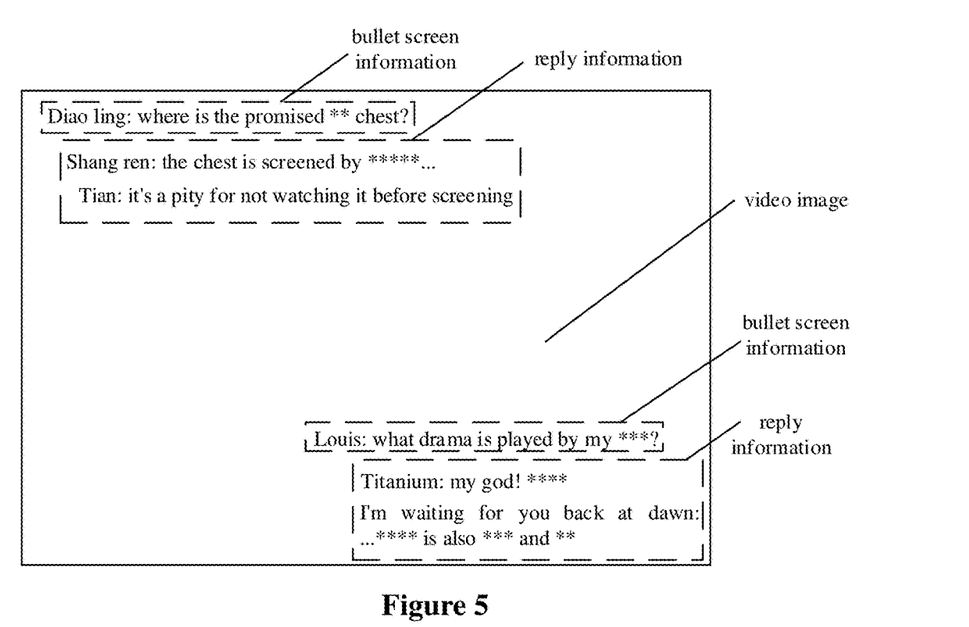
FIG. 5 is a schematic diagram of an interface display according to an embodiment of the present disclosure.

A user may reply to bullet screen information released by other users, or reply to a certain piece of reply information. As shown in FIG. 5, "Where is the promisedchest?" is released by a user "Diaoling", then a user "Shangren" replies to the user "Diaoling" by "the chest is screened by*** . . . ", and a user "Tian" replies to the user "Shangren" by "It's a pity for not watching it before screening". The video image is omitted in FIGS. 4 and 5.

As shown in FIGS. 4 and 5, preferably, reply information corresponding to the bullet screen information may be displayed in a manner that the reply information is indented with respect to the bullet screen information; for each piece of the bullet screen information, the bullet screen information and reply information corresponding to the bullet screen information may be displayed closely; and the bullet screen information may be displayed in a manner that one piece of the bullet screen information and reply information corresponding to the one piece of the bullet screen information are spaced from another piece of the bullet screen information and reply information corresponding to the another piece of the bullet screen information.

Optionally, a release account of a certain piece of bullet screen information may be paid attention to by the user. Accordingly, the process to be performed by the terminal may be as follows. An account attention option corresponding to a release account of the currently displayed first bullet screen information is displayed when the selection instruction corresponding to the first bullet screen information is received, an account identifier of the release account of the first bullet screen information and an account identifier of the local login account are obtained when a click instruction corresponding to the account attention option is received, and an account attention request is transmitted to the server. The account identifier of the release account of the first bullet screen information and the account identifier of the local login account are carried in the account attention request.

In implementation, during the playing of the target video, when the user wishes to pay attention to a certain release account, the user may click on the bullet screen information released by this release account (i.e. first bullet screen information). The terminal will receive the selection instruction corresponding to the current displayed first bullet screen information, and then display the account attention option corresponding to the release account of the first bullet screen information. The account attention option may be displayed separately by the terminal. Alternatively, the account attention option may be provided in a reply window corresponding to currently displayed first bullet screen information, with the reply window being displayed when a selection instruction corresponding to the first bullet screen information is received, as shown in FIG. 4. The user may click on the account attention option. The terminal will receive a click instruction corresponding to the account attention option, then obtain an identifier of the release account of the first bullet screen information and an identifier of a local login account, add the obtained identifiers to the account attention request, and transmit the account attention request to the server.

Optionally, in a situation in which the user may pay attention to a release account of a certain piece of bullet screen information, the corresponding process to be performed by the server may be as follows. The account attention request transmitted by the terminal is received, with the account identifier of the release account of the first bullet screen information and the account identifier of the login account of terminal being carried in the account attention request, and the release account of the first bullet screen information is added to the account attention list of the login account of the terminal.

In implementation, after receiving the account attention request transmitted by the terminal, the server may parse the account attention request, to obtain the account identifier of the release account of the first bullet screen information and the account identifier of the login account of the terminal carried in the account attention request. And then the server may search for the account attention list corresponding to the login account among all stored account attention lists based on the account identifier of the login account of the terminal. Then the server may add the account identifier of the release account of the first bullet screen information into the account attention list corresponding to the login account of the terminal, or mark the release account of the first bullet screen information as the account concerned by the login account of the terminal.

In step 303, an information transmission instruction corresponding to the reply window is received, second bullet screen information inputted by a user in the reply window is obtained, the second bullet screen information is displayed corresponding to displaying of the first bullet screen information, and a reply information adding request corresponding to the first bullet screen information is transmitted to a server, with the second bullet screen information and an identifier of the first bullet screen information being carried in the reply information adding request.

In implementation, after the terminal displays the reply window corresponding to the first bullet screen information, the user may input, in the input box for inputting the reply information in the reply window of the first bullet screen information, the reply information to be released (i.e. second bullet screen information), and then click on the transmission button. The terminal will receive an information transmission instruction corresponding to the reply window. The second bullet screen information inputted by the user in the input box may be obtained by the terminal. Then the second bullet screen information may be displayed locally corresponding to the displaying of the first bullet screen information. For example, the second bullet screen information may be displayed by the terminal below or on the right side of the first bullet screen information. In addition to the bullet screen information released by the user, the terminal may also display an account name of the release account of the bullet screen information (such as nickname). For example, the account name may be displayed on the left side of the bullet screen information (Tian: It's a pity for not watching it before screening).

The server may regard a certain piece of bullet screen information and reply information corresponding to this bullet screen information as a data set, and then transmit data sets of multiple pieces of bullet screen information corresponding to the target video to the terminal. The terminal may display the bullet screen information and reply information in a certain data set in a certain display region. The terminal may display data sets corresponding to different pieces of bullet screen information in different display regions, so that the user can conveniently view the reply information of each piece of bullet screen information, as shown in FIG. 5.

A corresponding identifier may be provided for each piece of bullet screen information and each piece of reply information. After receiving an information transmission instruction corresponding to the reply window, the second bullet screen information inputted by the user in the input box may be obtained by the terminal. Then the second bullet screen information inputted by the user and the identifier of the first bullet screen information may be added to the reply information adding request. The reply information adding request is transmitted to the server for subsequent processing.

In step 304, a reply information adding request corresponding to the first bullet screen information and transmitted by the terminal is received by the server, with the second bullet screen information and an identifier of the first bullet screen information being carried in the reply information adding request.

In implementation, after receiving the reply information adding request transmitted by the terminal, the server may parse the reply information adding request to obtain the second bullet screen information inputted by the user and the identifier of the first bullet screen information for subsequent processing.

In step 305, the second bullet screen information is added by the server to the bullet screen information of the target video; and the second bullet screen information is recorded by the server as reply information of the first bullet screen information.

In implementation, after obtaining the second bullet screen information inputted by the user and the identifier of the first bullet screen information, the server may add the second bullet screen information to the bullet screen information of the target video, and mark the second bullet screen information as the reply information of the first bullet screen information. For example, if the identifier of the first bullet screen information is b, the identifier of the second bullet screen information may be set as b1. In addition, the second bullet screen information may be added to the data set corresponding to the first bullet screen information.

In embodiments of the present disclosure, a target video is played. Bullet screen information of the target video is displayed during the playing of the target video. A reply window corresponding to currently displayed first bullet screen information is displayed when a selection instruction corresponding to the first bullet screen information is received. An information transmission instruction corresponding to the reply window is received. Second bullet screen information inputted by a user in the reply window is obtained. The second bullet screen information is displayed correspondingly while the first bullet screen information is displayed. A reply information adding request corresponding to the first bullet screen information is transmitted to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information. In this way, in the process of watching the target video, a user may not only release bullet screen information but also reply to bullet screen information released by other users, thereby improving the flexibility of releasing bullet screen information by the user.

Third Embodiment

Figure 6:
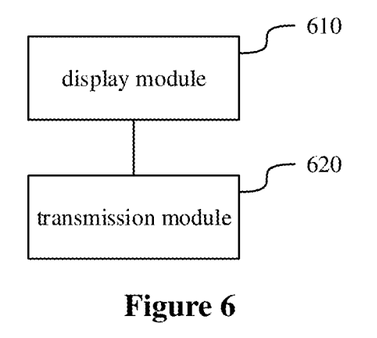
FIG. 6 is a schematic structural diagram of a terminal according to an embodiment of the present disclosure.

Based on the same technical conception, in an embodiment of the present disclosure, it is further provided a terminal, as shown in FIG. 6. The terminal includes a display module 610 and a transmission module 620.

The display module 610 is configured to play a target video and display bullet screen information of the target video during the playing of the target video.

The display module 610 is further configured to display a reply window corresponding to currently displayed first bullet screen information when a selection instruction corresponding to the first bullet screen information is received.

The transmission module 620 is configured to receive an information transmission instruction corresponding to the reply window, obtain second bullet screen information inputted by a user in the reply window, display the second bullet screen information corresponding to displaying of the first bullet screen information, and transmit a reply information adding request corresponding to the first bullet screen information to a server, with the second bullet screen information and an identifier of the first bullet screen information being carried in the reply information adding request, so that the server can add the second bullet screen information to the bullet screen information of the target video and record the second bullet screen information as reply information of the first bullet screen information.

Optionally, the display module 610 is configured to select, among the bullet screen information of the target video, bullet screen information corresponding to which the reply information adding request has been transmitted by a local login account, and reply information corresponding to this bullet screen information, and display the bullet screen information of the target video during the playing of the target video. Specifically, the selected bullet screen information and reply information are displayed firstly among multiple pieces of bullet screen information corresponding to each bullet screen time point.

Optionally, the display module 610 is configured to select, among the bullet screen information of the target video, bullet screen information with the number of replies greater than a preset threshold, and reply information corresponding to this bullet screen information, and display the selected bullet screen information and reply information during the playing of the target video.

Optionally, the display module 610 is configured to select, among the bullet screen information of the target video, bullet screen information with the number of replies greater than a preset threshold, and reply information corresponding to this bullet screen information, and display, during the playing of the target video, the selected bullet screen information and reply information based on preset first display mode information, and the bullet screen information other than the selected bullet screen information and reply information based on the preset second display mode information.

Optionally, the display module 610 is further configured to display an account attention option corresponding to a release account of the currently displayed first bullet screen information when the selection instruction corresponding to the first bullet screen information is received.

The transmission module 620 is further configured to obtain an account identifier of the release account of the first bullet screen information and an account identifier of the local login account when a click instruction corresponding to the account attention option is received, and transmit an account attention request to the server. The account identifier of the release account of the first bullet screen information and the account identifier of the local login account are carried in the account attention request.

Optionally, the display module 610 is configured to select, among the bullet screen information of the target video, bullet screen information released by an account in an account attention list corresponding to the local login account, and reply information corresponding to this bullet screen information, and display the bullet screen information of the target video during the playing of the target video. Specifically, the selected bullet screen information and reply information are displayed firstly among multiple pieces of bullet screen information corresponding to each bullet screen time point.

Figure 7:
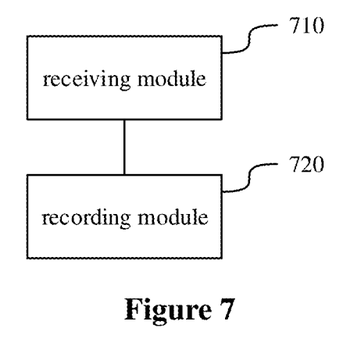
FIG. 7 is a schematic structural diagram of a server according to an embodiment of the present disclosure.

Based on the same technical conception, in an embodiment of the present disclosure, it is further provided a server, as shown in FIG. 6. The server includes a receiving module 710 and a recording module 720.

The receiving module 710 is configured to receive a reply information adding request corresponding to first bullet screen information and transmitted by a terminal. Second bullet screen information and an identifier of the first bullet screen information are carried in the reply information adding request.

The recording module 720 is configured to add the second bullet screen information to the bullet screen information of the target video and record the second bullet screen information as reply information of the first bullet screen information.

Optionally, the receiving module 710 is further configured to receive an account attention request transmitted by the terminal. An account identifier of a release account of the first bullet screen information and an account identifier of a login account of the terminal are carried in the account attention request.

The recording module 720 is further configured to add the release account of the first bullet screen information to an account attention list of the login account of the terminal.

In embodiments of the present disclosure, a target video is played. Bullet screen information of the target video is displayed during the playing of the target video. A reply window corresponding to currently displayed first bullet screen information is displayed when a selection instruction corresponding to the first bullet screen information is received. An information transmission instruction corresponding to the reply window is received. Second bullet screen information inputted by a user in the reply window is obtained. The second bullet screen information is displayed correspondingly while the first bullet screen information is displayed. A reply information adding request corresponding to the first bullet screen information is transmitted to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information. In this way, in the process of watching the target video, a user may not only release bullet screen information but also reply to bullet screen information released by other users, thereby improving the flexibility of releasing bullet screen information by the user.

Fourth Embodiment

Based on the same technical conception, in an embodiment of the present disclosure, it is further provided a system for displaying bullet screen information. The system includes a terminal and a server.

The terminal is configured to play a target video and display bullet screen information of the target video during the playing of the target video. The terminal is further configured to display a reply window corresponding to currently displayed first bullet screen information when a selection instruction corresponding to the first bullet screen information is received. The terminal is further configured to receive an information transmission instruction corresponding to the reply window, obtain second bullet screen information inputted by a user in the reply window, display the second bullet screen information corresponding to displaying of the first bullet screen information, and transmit a reply information adding request corresponding to the first bullet screen information to a server. The second bullet screen information and an identifier of the first bullet screen information are carried in the reply information adding request.

The server is configured to receive the reply information adding request corresponding to the first bullet screen information and transmitted by the terminal. The server is further configured to add the second bullet screen information to the bullet screen information of the target video, and record the second bullet screen information as reply information of the first bullet screen information.

In embodiments of the present disclosure, a target video is played. Bullet screen information of the target video is displayed during the playing of the target video. A reply window corresponding to currently displayed first bullet screen information is displayed when a selection instruction corresponding to the first bullet screen information is received. An information transmission instruction corresponding to the reply window is received. Second bullet screen information inputted by a user in the reply window is obtained. The second bullet screen information is displayed correspondingly while the first bullet screen information is displayed. A reply information adding request corresponding to the first bullet screen information is transmitted to a server. The second bullet screen information and an identifier of the first bullet screen information are carried in the reply information adding request, so as to add, by the server, the second bullet screen information to the bullet screen information of the target video; and to record, by the server, the second bullet screen information as reply information of the first bullet screen information. In this way, in the process of watching the target video, a user may not only release bullet screen information but also reply to bullet screen information released by other users, thereby improving the flexibility of releasing bullet screen information by the user.

Fifth Embodiment

Figure 8:
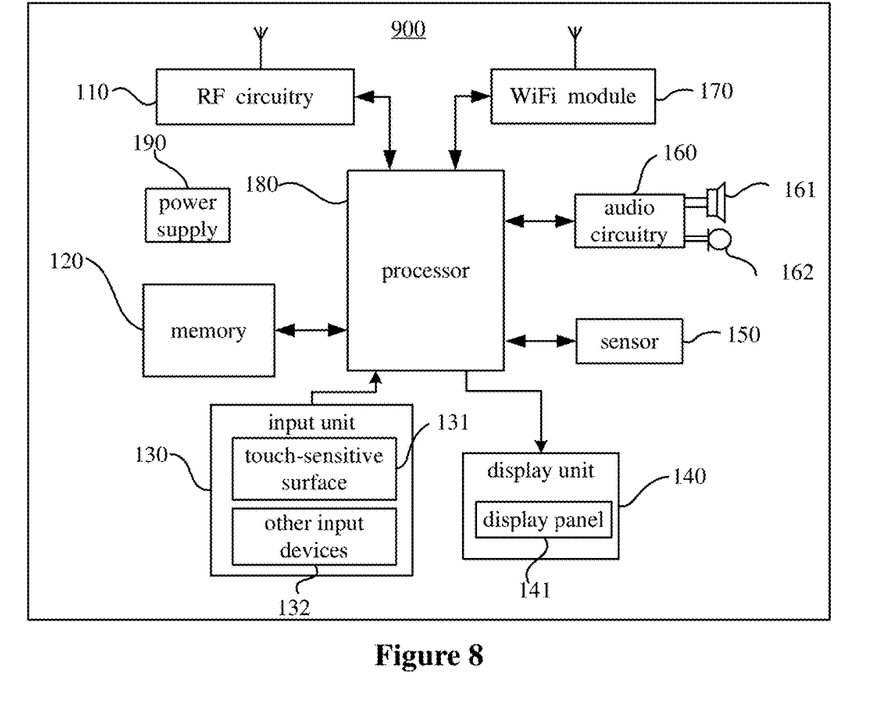
FIG. 8 is a schematic structural diagram of a terminal according to an embodiment of the present disclosure.

Reference is made to FIG. 8, which shows a schematic structural diagram of a terminal structure with a touch-sensitive surface according to an embodiment of the present disclosure. The terminal may be configured to implement the method for displaying bullet screen information according to the embodiment described above.

Specifically, the terminal 900 may include an RF (Radio Frequency) circuitry 110, a memory 120 including one or more computer-readable storage media, an input unit 130, a display unit 140, a sensor 150, an audio circuitry 160, a WiFi module 170, a processor 180 including one or more processing cores, a power supply 190 and the like. It will be understood by those skilled in the art that the terminal is not limited to the structure shown in FIG. 8, and may include more components or fewer components than those shown in FIG. 8, or a combination of some components, or an arrangement of different components.

The RF circuitry 110 may be configured to receive and transmit signals during the process of message communication or calling, and in particular to receive downlink information from a base station and transmit the downlink information to one or more processors 180 for processing. In addition, the RF circuitry 110 may be configured to transmit data related to the uplink to the base station. Generally, the RF circuitry 110 includes but is not limited to an antenna, at least one amplifier, a tuner, one or more oscillators, a subscriber identity module (SIM) card, a transceiver, a coupler, an LNA (Low Noise Amplifier), a duplexer and the like. In addition, the RF circuitry 110 may communicate with the network and other devices through wireless communication. The wireless communication may be implemented by any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) and the like.

The memory 120 may be configured to store software programs and modules, which may be executed by the processor 180 to execute various applications as well as data processing. The memory 120 may mainly include a program storage region and a data storage region. In the program storage region, it may be stored operating systems, applications required for at least one function (such as a sound playback function and an image playback function) and the like. In the data storage region, it may be stored data created base on the using of the terminal 900 (such as audio data and phone book) and the like. In addition, the memory 120 may include a high-speed random access memory. The memory 120 may further include a non-volatile memory, such as at least one magnetic disk storage device, a flash memory device, or other non-volatile solid state memory device. Accordingly, the memory 120 may further include a memory controller to provide access to the memory 120 by the processor 180 and the input unit 130.

The input unit 130 may be configured to receive inputted digital or character information, and generate a keyboard signal input, a mouse signal input, an operating rod signal input, an optical signal input or a track ball signal input that are related to user settings and function control. Specifically, the input unit 130 may include a touch-sensitive surface 131 and other input devices 132. The touch-sensitive surface 131, also referred to as a touch screen or touch pad, may collect touch operations on or near it by a user (such as operations on or near the touch-sensitive surface 131 by a user using a finger, a stylus or other suitable objects or accessories), and drive a corresponding connection device according to a preset program. Optionally, the touch-sensitive surface 131 may include a touch detection device and a touch controller. The touch detection device detects a touch orientation of a user, and detects signals of the touch operation to transmit the signals to the touch controller. The touch controller receives the touch information from the touch detection device, converts the touch information into coordinates of a touch point, and then transfers the coordinates to the processor 180. The touch controller may further receive and execute commands from the processor 180. In addition, the touch-sensitive surface 131 may be realized by various touch-sensitive technical types, such as resistive type, capacitive type, infrared light type and surface acoustic wave type. In addition to the touch-sensitive surface 131, the input unit 130 may include other input devices 132. Specifically, other input devices 132 may include but are not limited to one or more of a physical keyboard, a function key (such as a volume control button and a switch button), a trackball, a mouse, an operating rod and the like.

The display unit 140 may be configured to display information input by a user or information provided to the user or various graphical user interfaces of the terminal 900. The graphical user interfaces may include graphics, texts, icons, videos and any combination thereof. The display unit 140 may include a display panel 141. Optionally, the display panel 141 may be configured in the form of an LCD (Liquid Crystal Display), an OLED (Organic Light-Emitting Diode) or the like. Further, the touch-sensitive surface 131 may cover the display panel 141. On detection of a touch operation on or near the touch-sensitive surface 131, the touch operation is transmitted to the processor 180 to determine the type of the touch event, and then the processor 180 provides a corresponding visual output on the display panel 141 based on the type of the touch event. Although the touch-sensitive surface 131 and the display panel 141 are shown in FIG. 8 as two separate components for realizing an input and an output function, the touch-sensitive surface 131 in some embodiments may be integrated with the display panel 141 to realize the input and output function.

The terminal 900 may also include at least one sensor 150, such as a light sensor, a motion sensor and other sensors. Specifically, the light sensor may include an ambient light sensor and a proximity sensor. The ambient light sensor may adjust the brightness of the display panel 141 according to the brightness of the ambient light, and the proximity sensor may close the display panel 141 and/or back light when the terminal 900 is moved near the ear. As a motion sensor, the gravity acceleration sensor may detect the magnitude of acceleration in all directions (typically three axis), and may detect the magnitude and direction of gravity at rest. The gravity acceleration sensor may be applied to applications for identifying the gesture of the mobile phone (such as horizontal and vertical screen switching, related games and magnetometer attitude calibration), vibration identification related functions (such as a pedometer and a tap) and the like. The terminal 900 may be further include other sensors, such as a gyroscope, a barometer, a hygrometer, a thermometer, an infrared sensor and the like, which are not described herein.

An audio circuitry 160, a speaker 161, and a microphone 162 may be configured to provide an audio interface between a user and the terminal 900. The audio circuitry 160 may be configured to transfer, to the speaker 161, an electrical signal which is converted from the received audio data, and then the speaker 616 is configured to convert the electrical signal into a sound signal output. The microphone 162 is configured to convert a collected sound signal into the electrical signal which is to be received by the audio circuitry 160 and then converted to audio data. The audio data are outputted to and processed by the processor 180, and then for example transmitted, through the RF circuitry 110, to another terminal or outputted to the memory 120 for further processing. The audio circuitry 160 may further include a headset jack to provide communication with the terminal 900 for the peripheral headset.

WiFi is a short-range wireless transmission technology, which provides users with wireless broadband Internet access. Through the WiFi module 170, the terminal 900 can help users to send and receive e-mail, browse the web, access to streaming media and the like. Although FIG. 8 shows the WiFi module 170, it should be understood that the WiFi module 170 is not a necessary component of the terminal 900, and may be omitted without departing from the essence of the disclosure.

The processor 180 is the control center of the terminal 900, and configured to connect various parts of the mobile phone via various interfaces and lines. By operating or executing the software programs and/or modules stored in the memory 120 and calling the data stored in the memory 120, the processor 180 is configured to perform various functions and data processing of the terminal 900, thereby overall monitoring the mobile phone. Optionally, the processor 180 may include one or more processing cores. Preferably, the processor 180 may be integrated with an application processor and a modem processor. The application processor mainly processes an operating system, a user interface, an application and the like, and the modem processor mainly processes wireless communications. It is to be understood that, the above-described modem processor may not be integrated into the processor 180.

The terminal 900 further includes a power supply 190 (such as a battery) for supplying power to various components. Preferably, the power supply may be logically connected to the processor 180 through a power management system, so as to manage charging, discharging and power consumption management functions via the power management system. The power supply 190 may also include any one or more components, such as a DC power supply or an AC power supply, a recharge system, a power failure detection circuitry, a power converter or inverter and a power supply status indicator.

Although not shown, the terminal 900 may also include a camera, a Bluetooth module and the like, which will not be described herein. Specifically, the display unit of the terminal 900 is a touch screen. The terminal 900 further includes a memory, and one or more programs stored in the memory and configured to be executed by one or more processors for performing the method for displaying the bullet screen information described in the above embodiments.

In an exemplary embodiment, it is further provided a non-transient computer-readable storage medium including instructions, such as a memory including instructions which may be executed by a processor of a mobile terminal to perform the above described method for displaying the bullet screen information. For example, the non-transient computer-readable storage medium may be an ROM (Read-Only Memory), an RAM (Random-Access Memory), a CD-ROM (Compact Disc Read-Only Memory), a magnetic tape, a floppy disk, an optical data storage device and the like.

Sixth Embodiment

Figure 9:
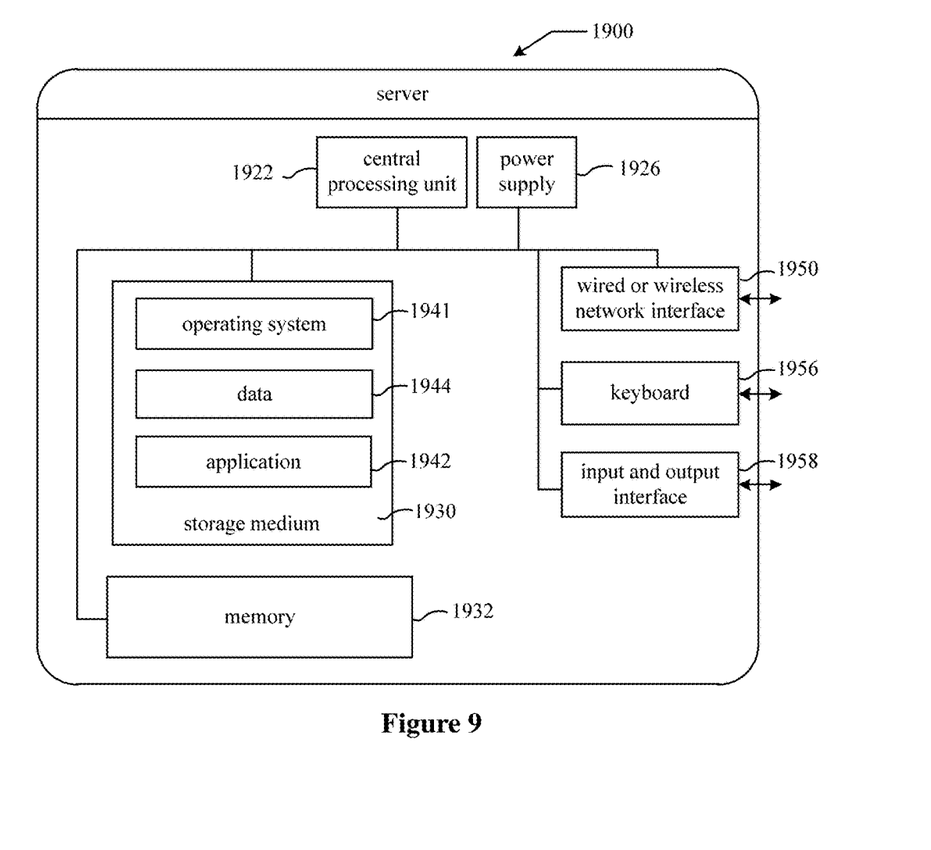
FIG. 9 is a schematic structural diagram of a server according to an embodiment of the present disclosure.

FIG. 9 is a schematic structural diagram of a server according to an embodiment of the present disclosure. The server 1900 may have different structures with respect to different configurations or performances. The server 1900 may include one or more central processing units (CPU) 1922 (e.g., one or more processors), a memory 1932, and one or more storage mediums 1930 (e.g., one or more mass storage devices) for storing application 1942 or data 1944. The memory 1932 and the storage medium 1930 may be short-term storage or persistent storage. The program stored in the storage medium 1930 may include one or more modules (which are not shown in the Figures), each of which may include a series of instructional operations for the server. Furthermore, the central processing unit 1922 may be configured to communicate with the storage medium 1930 to perform the series of instructional operations in the storage medium 1930 on the server 1900.

The server 1900 may also include one or more power supplies 1926, one or more wired or wireless network interfaces 1950, one or more input and output interfaces 1958, one or more keyboards 1956, and/or one or more operating systems 1941, such as Windows Server™, Mac OS X™, Unix™, Linux™ and FreeBSDT™.

The server 1900 may include a memory, and one or more programs which are stored in the memory and configured to be executed by one or more processors for performing the method for displaying the bullet screen information described in the above embodiments.

In an exemplary embodiment, it is further provided a non-transient computer-readable storage medium including instructions, such as a memory including instructions which may be executed by a processor of the server to perform the above described method for displaying the bullet screen information. For example, the non-transient computer-readable storage medium may be an ROM, an RAM, a CD-ROM, a magnetic tape, a floppy disk, an optical data storage device and the like.

It will be appreciated by those skilled in the art that all or some of the steps in the embodiments described above may be implemented in hardware, or may be implemented by programs instructing related hardware. The programs may be stored in a computer-readable storage medium, which may include a read-only memory, a magnetic disk, an optical disk or the like.

While the present disclosure has been described in detail with reference to the preferred embodiments, those skilled in the art will appreciate that various modifications and substitutions can be made thereto without departing from the spirit and scope of the present disclosure as set forth in the description and the appended claims.

The invention claimed is:

1. A method for displaying bullet screen information, comprising:

playing a target video, and displaying bullet screen information of the target video during the playing of the target video;

displaying a reply window corresponding to currently displayed first bullet screen information based on receipt of a selection instruction corresponding to the first bullet screen information;

receiving an information transmission instruction corresponding to the reply window, obtaining second bullet screen information inputted by a user in the reply window, displaying the second bullet screen information corresponding to displaying of the first bullet screen information, and transmitting a reply information adding request corresponding to the first bullet screen information to a server, with the second bullet screen information and an identifier of the first bullet screen information being carried in the reply information adding request, wherein the server adds the second bullet screen information to the bullet screen information of the target video, and records the second bullet screen information as reply information of the first bullet screen information;

displaying an account attention option corresponding to a release account of the currently displayed first bullet screen information when the selection instruction corresponding to the first bullet screen information is received; and obtaining an account identifier of the release account of the first bullet screen information and an account identifier of the local login account when a click instruction corresponding to the account attention option is received, and transmitting an account attention request to the server, with the account identifier of the release account of the first bullet screen information and the account identifier of the local login account being carried in the account attention request.

2. The method according to claim 1, wherein the displaying the bullet screen information of the target video during the playing of the target video comprises:

selecting, among the bullet screen information of the target video, bullet screen information corresponding to which the reply information adding request has been transmitted by a local login account, and reply information corresponding to the bullet screen information; and displaying the bullet screen information of the target video during the playing of the target video, wherein the selected bullet screen information and reply information are displayed firstly among a plurality of pieces of bullet screen information corresponding to each bullet screen time point.

3. The method according to claim 1, wherein the displaying the bullet screen information of the target video during the playing of the target video comprises:

selecting, among the bullet screen information of the target video, bullet screen information with the number of replies greater than a preset threshold, and reply information corresponding to the bullet screen information; and displaying the selected bullet screen information and reply information during the playing of the target video.

4. The method according to claim 1, wherein the displaying the bullet screen information of the target video during the playing of the target video comprises:

selecting, among the bullet screen information of the target video, bullet screen information with the number of replies greater than a preset threshold, and reply information corresponding to the bullet screen information; and displaying, during the playing of the target video, the selected bullet screen information and reply information based on preset first display mode information, and the bullet screen information other than the selected bullet screen information and reply information based on preset second display mode information.

5. The method according to claim 1, wherein the displaying the bullet screen information of the target video during the playing of the target video comprises:

selecting, among the bullet screen information of the target video, bullet screen information released by an account in an account attention list corresponding to the local login account, and reply information corresponding to the bullet screen information; and displaying the bullet screen information of the target video during the playing of the target video, wherein the selected bullet screen information and reply information are displayed firstly among a plurality of pieces of bullet screen information corresponding to each bullet screen time point.

6. The method according to claim 1, wherein the displaying the bullet screen information of the target video comprises:

displaying reply information corresponding to the bullet screen information in a manner that the reply information is indented with respect to the bullet screen information.

7. The method according to claim 1, wherein the displaying the bullet screen information of the target video comprises:

for each piece of the bullet screen information, displaying closely the bullet screen information and reply information corresponding to the bullet screen information.

8. The method according to claim 1, wherein the displaying the bullet screen information of the target video comprises:

displaying the bullet screen information in a manner that one piece of the bullet screen information and reply information corresponding to the one piece of the bullet screen information are spaced from another piece of the bullet screen information and reply information corresponding to the another piece of the bullet screen information.

9. A terminal, comprising:
one or more processors; and
a memory having one or more programs stored therein that, when executed by the one or more processors, cause the one or more processors to perform operations comprising:
  playing a target video, and displaying bullet screen information of the target video during the playing of the target video;
  displaying a reply window corresponding to currently displayed first bullet screen information based on receipt of a selection instruction corresponding to the first bullet screen information;
  receiving an information transmission instruction corresponding to the reply window, obtaining second bullet screen information inputted by a user in the reply window, displaying the second bullet screen information corresponding to displaying of the first bullet screen information, and transmitting a reply information adding request corresponding to the first bullet screen information to a server, with the second bullet screen information and an identifier of the first bullet screen information being carried in the reply information adding request, wherein the server adds the second bullet screen information to the bullet screen information of the target video and records the second bullet screen information as reply information of the first bullet screen information:
  displaying an account attention option corresponding to a release account of the currently displayed first bullet screen information when the selection instruction corresponding to the first bullet screen information is received; and
  obtaining an account identifier of the release account of the first bullet screen information and an account identifier of the local login account when a click instruction corresponding to the account attention option is received, and transmitting an account attention request to the server, with the account identifier of the release account of the first bullet screen information and the account identifier of the local login account being carried in the account attention request.

10. The terminal according to claim 9, wherein the operations further comprise:
  selecting, among the bullet screen information of the target video, bullet screen information corresponding to which the reply information adding request has been transmitted by a local login account, and reply information corresponding to the bullet screen information; and
  displaying the bullet screen information of the target video during the playing of the target video, wherein the selected bullet screen information and reply information are displayed firstly among a plurality of pieces of bullet screen information corresponding to each bullet screen time point.

11. The terminal according to claim 9, wherein the operations further comprise:
  selecting, among the bullet screen information of the target video, bullet screen information with the number of replies greater than a preset threshold, and reply information corresponding to the bullet screen information; and
  displaying the selected bullet screen information and reply information during the playing of the target video.

12. The terminal according to claim 9, wherein the operations further comprise:
  selecting, among the bullet screen information of the target video, bullet screen information with the number of replies greater than a preset threshold, and reply information corresponding to the bullet screen information; and
  displaying, during the playing of the target video, the selected bullet screen information and reply information based on preset first display mode information, and the bullet screen information other than the selected bullet screen information and reply information based on preset second display mode information.

13. The terminal according to claim 9, wherein the operations further comprise:
  selecting, among the bullet screen information of the target video, bullet screen information released by an account in an account attention list corresponding to the local login account, and reply information corresponding to the bullet screen information; and
  displaying the bullet screen information of the target video during the playing of the target video, wherein the selected bullet screen information and reply information are displayed firstly among a plurality of pieces of bullet screen information corresponding to each bullet screen time point.

14. The terminal according to claim 9, wherein the operations further comprise:
  displaying reply information corresponding to the bullet screen information in a manner that the reply information is indented with respect to the bullet screen information.

15. The terminal according to claim 9, wherein the operations further comprise:
  for each piece of the bullet screen information, displaying closely the bullet screen information and reply information corresponding to the bullet screen information.

16. The terminal according to claim 9, wherein the operations further comprise:
  displaying the bullet screen information in a manner that one piece of the bullet screen information and reply information corresponding to the one piece of the bullet screen information are spaced from another piece of the bullet screen information and reply information corresponding to the another piece of the bullet screen information.

* * * * *